United States Patent
Dev

(10) Patent No.: US 11,422,559 B2
(45) Date of Patent: Aug. 23, 2022

(54) METHOD AND SYSTEM OF NAVIGATING AN AUTONOMOUS VEHICLE AT AN INTERSECTION OF ROADS

(71) Applicant: Wipro Limited, Bangalore (IN)

(72) Inventor: Yuvika Dev, Bangalore (IN)

(73) Assignee: Wipro Limited, Bangalore (IN)

(*) Notice: Subject to any disclaimer, the term of this patent is extended or adjusted under 35 U.S.C. 154(b) by 294 days.

(21) Appl. No.: 16/836,235

(22) Filed: Mar. 31, 2020

(65) Prior Publication Data

US 2020/0225662 A1 Jul. 16, 2020

(30) Foreign Application Priority Data

Feb. 18, 2020 (IN) .............................. 202041007006

(51) Int. Cl.
*G06T 7/70* (2017.01)
*G06V 40/20* (2022.01)
(Continued)

(52) U.S. Cl.
CPC ......... *G05D 1/0088* (2013.01); *G05D 1/0221* (2013.01); *G05D 1/0253* (2013.01); *G06N 3/08* (2013.01); *G06T 7/70* (2017.01); *G06V 20/56* (2022.01); *G06V 40/10* (2022.01); *G06V 40/28* (2022.01); *G05D 2201/0213* (2013.01); *G06T 2207/10016* (2013.01);
(Continued)

(58) Field of Classification Search
CPC ... G06T 7/20; G06T 7/70; G06T 2207/30196; G06T 2207/30252; G06V 20/56; G06V 20/58; G06V 20/582; G06V 20/584; G06V 20/586; G06V 20/588; G06V 40/20; G06V 40/28; G06K 9/00; G05D 1/0231; G05D 1/0246; G05D 1/0253
See application file for complete search history.

(56) References Cited

U.S. PATENT DOCUMENTS

2016/0144867 A1 5/2016 Delp et al.
2017/0364759 A1* 12/2017 Creusot ................ G08G 1/0955
(Continued)

FOREIGN PATENT DOCUMENTS

CN 109389838 A 2/2016

*Primary Examiner* — Andrew W Johns
(74) *Attorney, Agent, or Firm* — Finnegan, Henderson, Farabow, Garrett & Dunner, LLP

(57) ABSTRACT

Disclosed subject matter relates to a field of vehicle navigation system that performs a method for navigating an autonomous vehicle at an intersection of roads. An intersection management system may receive sensor data including at least one of depth of an object, images and a video of environment surrounding the autonomous vehicle. Further, traffic police and auxiliary objects associated with each traffic police are detected from plurality of objects of interest present in the images, when the autonomous vehicle is within a predefined distance from an intersection of roads. Thereafter, a correlation matrix comprising inferred data related to each traffic police and the auxiliary objects may be generated. Based on the correlation matrix, the video and the images, a gesture of the traffic police may be determined accurately. Finally, navigation information may be determined based on the correlation matrix and determined gesture, for navigating the autonomous vehicle.

11 Claims, 6 Drawing Sheets

(51) Int. Cl.
*G05D 1/00* (2006.01)
*G05D 1/02* (2020.01)
*G06N 3/08* (2006.01)
*G06V 20/56* (2022.01)
*G06V 40/10* (2022.01)

(52) U.S. Cl.
CPC .............. *G06T 2207/20084* (2013.01); *G06T 2207/30196* (2013.01); *G06T 2207/30252* (2013.01)

(56) References Cited

U.S. PATENT DOCUMENTS

| | | | |
|---|---|---|---|
| 2018/0082134 A1 | 3/2018 | Sivaraman | |
| 2020/0346664 A1* | 11/2020 | Sippl et al. | B60W 50/06 |
| 2020/0377119 A1* | 12/2020 | Khlifi | G01S 7/354 |
| 2021/0280059 A1* | 9/2021 | Fiszer et al. | G08G 1/096741 |

* cited by examiner

METHOD AND SYSTEM OF NAVIGATING AN AUTONOMOUS VEHICLE AT AN INTERSECTION OF ROADS

TECHNICAL FIELD

The present subject matter relates generally to the field of vehicle navigation system, and more particularly, but not exclusively to a method and a system for navigating an autonomous vehicle at an intersection of roads.

BACKGROUND

Nowadays, developments in autonomous vehicle technology have increased rapidly. Autonomous vehicles are the vehicles that are capable of sensing environment around them for moving on the road without any human intervention. The autonomous vehicles sense the environment with help of sensors configured to work in systems such as Light Detection and Ranging (LIDAR) system, Image capturing devices, Global Positioning System (GPS) and the like. The autonomous vehicle technology aims to reduce energy consumption, pollution, reduce frequency of crashes and congestion thereby providing increased road safety.

Currently existing techniques for autonomous vehicles are sophisticated to navigate the autonomous vehicles. However, these sophisticated techniques fail to handle extreme and unexpected events in real-time, in a way that humans handle. For instance, when a traffic signal is not functional in an intersection such as four-way intersection, humans rely on the gestures of a traffic police and their intelligence to navigate the vehicle in accordance with the surroundings. However, autonomous vehicles lack such intelligence to handle or react to such unexpected events, which may lead to accidents at the intersection areas.

Few existing techniques disclose methods for identifying gesture of traffic police to navigate the autonomous vehicles. However, such methods are limited to some predefined gestures of the traffic police, which fail to detect runtime variations of the traffic police that may occur at an intersection. Moreover, such existing techniques fail to provide adaptive decision-making capability in different circumstances such as in the presence of multiple signboards, presence of multiple traffic police or traffic directors and the like, which would lead to traffic congestions, accidents and the like.

The information disclosed in this background of the disclosure section is only for enhancement of understanding of the general background of the disclosure and should not be taken as an acknowledgement or any form of suggestion that this information forms prior art already known to a person skilled in the art.

SUMMARY

Disclosed herein is a method of navigating an autonomous vehicle at an intersection of roads. The method includes receiving, by an intersection management system configured in the autonomous vehicle, sensor data from one or more sensors configured in the autonomous vehicle. The sensor data includes at least one of depth of an object with respect to the autonomous vehicle, and one or more images and a video of environment surrounding the autonomous vehicle. Further, the method includes detecting one or more traffic police and one or more auxiliary objects associated with each of the one or more traffic police from a plurality of objects of interest present in the one or more images, when the autonomous vehicle is within a predefined distance from an intersection of roads. Subsequently, the method includes generating a correlation matrix comprising inferred data related to each of the one or more traffic police and the one or more auxiliary objects associated with the corresponding one or more traffic police. Upon generating the correlation matrix, the method includes determining a gesture of the one or more traffic police based on the correlation matrix, and at least one of the video and the one or more images. Finally, the method includes determining navigation information for the autonomous vehicle based on the determined gesture, for navigating the autonomous vehicle.

Further, the present disclosure includes an intersection management system for navigating an autonomous vehicle at an intersection of roads. The intersection management system includes a processor and a memory communicatively coupled to the processor. The memory stores the processor-executable instructions, which, on execution, causes the processor to receive sensor data from one or more sensors configured in the autonomous vehicle. The sensor data includes at least one of depth of an object with respect to the autonomous vehicle, and one or more images and a video of environment surrounding the autonomous vehicle. Further, the processor detects one or more traffic police and one or more auxiliary objects associated with each of the one or more traffic police from a plurality of objects of interest present in the one or more images, when the autonomous vehicle is within a predefined distance from an intersection of roads. Subsequently, the processor generates a correlation matrix comprising inferred data related to each of the one or more traffic police and the one or more auxiliary objects associated with the corresponding one or more traffic police. Upon generating the correlation matrix, the processor determines a gesture of the one or more traffic police based on the correlation matrix, and at least one of the video and the one or more images. Finally, the processor determines navigation information for the autonomous vehicle based on the determined gesture, for navigating the autonomous vehicle.

Furthermore, the present disclosure comprises a non-transitory computer readable medium including instructions stored thereon that when processed by at least one processor causes the intersection management system to perform operations comprising receiving sensor data from one or more sensors configured in the autonomous vehicle. The sensor data comprises at least one of depth of an object with respect to the autonomous vehicle, and one or more images and a video of environment surrounding the autonomous vehicle. Further, the instructions cause the processor to detect one or more traffic police and one or more auxiliary objects associated with each of the one or more traffic police from a plurality of objects of interest present in the one or more images, when the autonomous vehicle is within a predefined distance from an intersection of roads. Also, the instructions cause the processor to generate a correlation matrix comprising inferred data related to each of the one or more traffic police and the one or more auxiliary objects associated with the corresponding one or more traffic police. Furthermore, the instructions cause the processor to determine a gesture of the one or more traffic police based on the correlation matrix, and at least one of the video and the one or more images. Finally, the instructions cause the processor to determine navigation information for the autonomous vehicle based on the correlation matrix and the determined gesture, for navigating the autonomous vehicle.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DIAGRAMS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1:
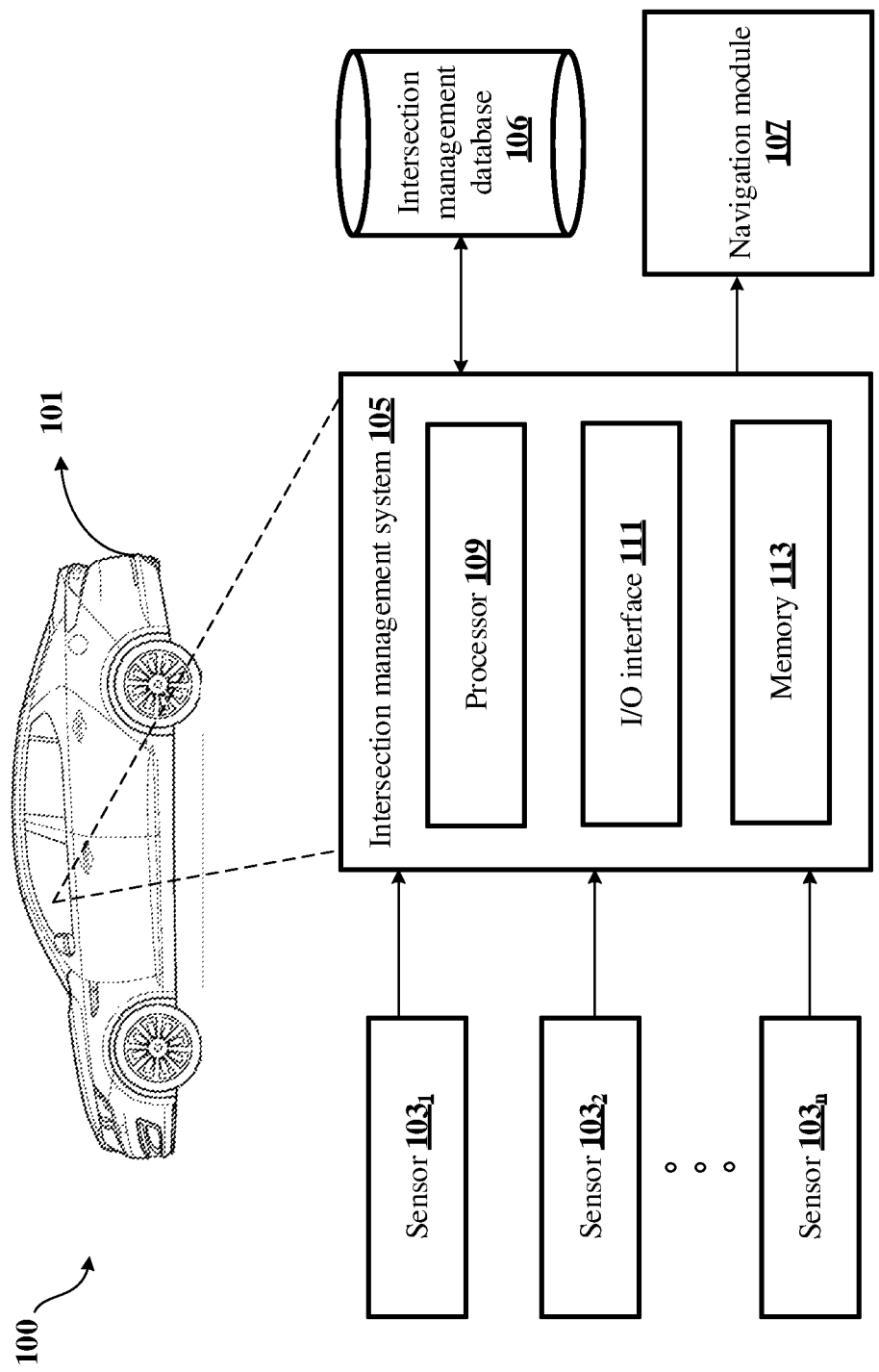
FIG. 1 shows an exemplary architecture for navigating an autonomous vehicle at an intersection of roads in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the scope of the disclosure.

The terms "comprises", "comprising", "includes" or any other variations thereof, are intended to cover a non-exclusive inclusion, such that a setup, device or method that includes a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

Disclosed herein is a method and a system for navigating an autonomous vehicle at an intersection of roads. An intersection management system associated with the autonomous vehicle may receive sensor data from one or more sensors configured in the autonomous vehicle. In some embodiments, the sensor data may include, but not limited to, depth of an object with respect to the autonomous vehicle, one or more images and a video of environment surrounding the autonomous vehicle. In some embodiments, each of the one or more images may include a plurality of objects of interest. When the autonomous vehicle is within a predefined distance from an intersection of roads, the intersection management system may detect one or more traffic police and one or more auxiliary objects associated with each of the one or more traffic police from the plurality of objects of interest. Further, the intersection management system may generate a correlation matrix. In some embodiments, the correlation matrix may include inferred data related to each of the one or more traffic police and the one or more auxiliary objects associated with the corresponding one or more traffic police. As an example, the inferred data may include, but not limited to, an identifier of each of the one or more traffic police, location of each of the one or more traffic police with respect to the autonomous vehicle, indication of presence or absence of the one or more auxiliary objects, type of each of the one or more auxiliary objects, and values of each of the one or more auxiliary objects associated with each of the one or more traffic police, or position of each of the one or more auxiliary objects with respect to the corresponding one or more traffic police. Upon generating the correlation matrix, the intersection management system may determine a gesture of the one or more traffic police based on the correlation matrix, and at least one of the video and the one or more images. Further, the intersection management system may determine navigation information for the autonomous vehicle based on the correlation matrix and the determined gesture, for navigating the autonomous vehicle.

The present disclosure provides a feature wherein the correlation matrix is generated to infer data related to one or more traffic police present at the intersection. The inferred data provides information such as distance of the traffic police from the autonomous vehicle, presence or absence of auxiliary objects, position and value of auxiliary objects and the like, which helps in maintaining co-ordination in scenarios where multiple traffic police are directing the traffic at an intersection. Also, the present disclosure uses Convolutional Neural Network (CNN) techniques to determine dynamic hand gestures of the one or more traffic police, by learning spatiotemporal features from consecutive frames of at least one of the video and the one or more images. This combination of correlation matrix and the CNN techniques to determine the gesture of the one or more traffic police helps in accommodating and detecting runtime variations introduced by the traffic police while directing the traffic. Further, the present disclosure processes only the area of the one or more images and the video, where the object of interest is located. This helps in optimizing the overall performance of the intersection management system by reducing unwanted computation load.

A description of an embodiment with several components in communication with each other does not imply that all such components are required. On the contrary, a variety of optional components are described to illustrate the wide variety of possible embodiments of the disclosure.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary architecture for navigating an autonomous vehicle at an intersection of roads in accordance with some embodiments of the present disclosure.

The architecture 100 includes an autonomous vehicle 101, one or more sensors, sensor $103_1$ to sensor 103. (collectively referred as one or more sensors 103), an intersection management system 105, an intersection management database 106 and a navigation module 107. As an example, the autonomous vehicle 101 may be a bike, a car, a truck, a bus and the like. In an embodiment, the autonomous vehicle 101 may be configured with the one or more sensors 103. As an example, the one or more sensors 103 may include, but not limited to, Light Detection and Ranging (LIDAR) system, Radio Detection and Ranging (RADAR), Inertial Measurement Unit (IMU), Ultrasonic Sensors, image capturing devices such as stereoscopic depth cameras, and Global Positioning System (GPS). In some embodiments, the one or more sensors 103 may communicate with the intersection management system 105 via a communication network (not shown in FIG. 1). As an example, the communication network may include a wired communication network or a wireless communication network. In some embodiments, the intersection management system 105 may be configured in the autonomous vehicle 101 as shown in the FIG. 1. In some other embodiments, the intersection management system 105 may be configured in a remote system such as a cloud platform, server and the like.

The intersection management system 105 includes a processor 109, an Input/Output (I/O) interface 111 and a memory 113. The I/O interface 111 may be configured to receive sensor data from the one or more sensors 103, in real-time. As an example, the sensor data may include, but not limited to, depth of an object with respect to the autonomous vehicle 101, and one or more images and a video of environment surrounding the autonomous vehicle 101. As an example, the objects in the one or more images and the video may include, but not limited to, trees, poles, rocks, traffic light signal, road barriers, parking signs, traffic signs, other vehicles, and human beings such as pedestrians, traffic police and the like. Further, the I/O interface 111 may receive scene data from an intersection management database 106 associated with the intersection management system 105. In some embodiments, the scene data may be real time traffic-related data pertaining to the intersection. Further, the processor 109 may store the sensor data in the memory 113 coupled with the processor 109.

The processor 109 may detect one or more traffic police and one or more auxiliary objects associated with each of the one or more traffic police from a plurality of objects of interest in the one or more images. As an example, the plurality of objects of interest may include, but not limited to, traffic light signal, a traffic sign, the one or more traffic police, and the one or more auxiliary objects associated with the one or more traffic police. In some embodiments, each of the plurality of objects of interest may be detected, tracked and marked with a bounding box. As an example, the processor 109 may employ one or more object detection and classification techniques to detect and track the plurality of objects of interest. In some embodiments, the processor 109 may detect the one or more traffic police and the one or more auxiliary objects associated with each of the one or more traffic police when the autonomous vehicle 101 is within a predefined distance from an intersection of roads.

Further, the processor 109 may generate a correlation matrix. In some embodiments, the correlation matrix may include inferred data related to each of the one or more traffic police and the one or more auxiliary objects associated with the corresponding one or more traffic police. As an example, the inferred data may include, but not limited to, an identifier of each of the one or more traffic police, location of each of the one or more traffic police with respect to the autonomous vehicle 101 (also referred as depth of the one or more traffic police), indication of presence or absence of the one or more auxiliary objects, type of each of the one or more auxiliary objects, and values of each of the one or more auxiliary objects associated with each of the one or more traffic police, or position of each of the one or more auxiliary objects with respect to the corresponding one or more traffic police. In some embodiments, the processor 109 may validate correctness of the information related to the detected objects in the one or more images and the detected gesture of the one or more traffic police using the scene data received from the intersection management database 106.

Upon generating the correlation matrix, the processor 109 may determine a gesture of the one or more traffic police based on the correlation matrix, and at least one of the video and the one or more images. Further, the processor 109 may determine navigation information for the autonomous vehicle 101 based on the correlation matrix and the determined gesture, for navigating the autonomous vehicle 101.

Finally, the processor 109 may provide the determined navigation information to a navigation module 107 associated with the intersection management system 105 to navigate the autonomous vehicle 101. In some embodiments, the navigation module 107 may be configured in the autonomous vehicle 101.

Figure 2A:
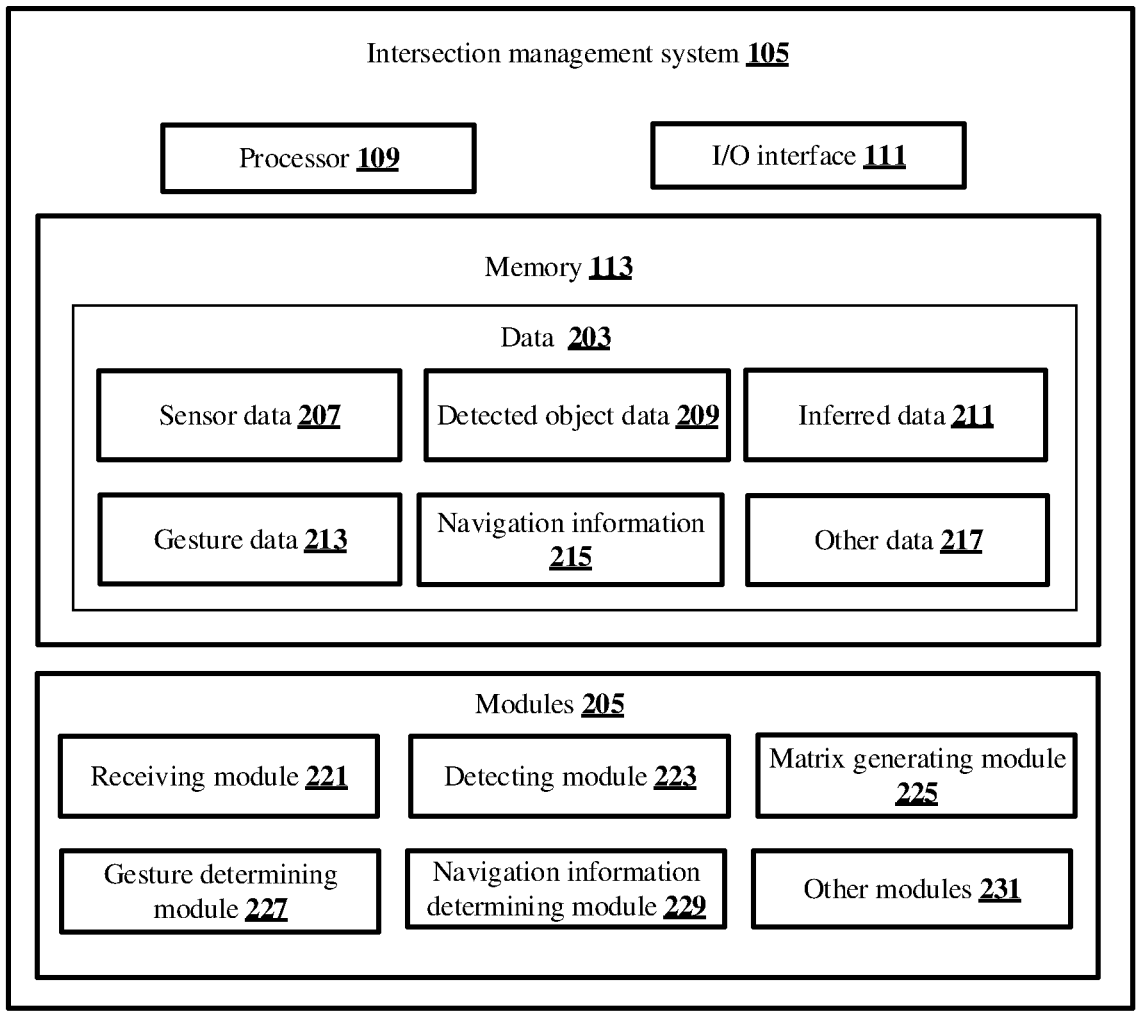
FIG. 2A shows a detailed block diagram of an intersection management system for navigating an autonomous vehicle at an intersection of roads in accordance with some embodiments of the present disclosure.

FIG. 2A shows a detailed block diagram of an intersection management system 105 for navigating an autonomous vehicle 101 at an intersection of roads in accordance with some embodiments of the present disclosure.

In some implementations, the intersection management system 105 may include data 203 and modules 205. As an example, the data 203 is stored in a memory 113 configured in the intersection management system 105 as shown in the FIG. 2A. In one embodiment, the data 203 may include sensor data 207, detected object data 209, inferred data 211, gesture data 213, navigation information 215 and other data 217. In the illustrated FIG. 2A, modules 205 are described herein in detail.

In some embodiments, the data 203 may be stored in the memory 113 in form of various data structures. Additionally, the data 203 can be organized using data models, such as relational or hierarchical data models. The other data 217 may store data, including temporary data and temporary files, generated by the modules 205 for performing the various functions of the intersection management system 105.

In some embodiments, the data 203 stored in the memory 113 may be processed by the modules 205 of the intersection management system 105. The modules 205 may be stored within the memory 113. In an example, the modules 205 communicatively coupled to the processor 109 configured in the intersection management system 105, may also be present outside the memory 113 as shown in FIG. 2A and implemented as hardware. As used herein, the term modules 205 may refer to an application specific integrated circuit (ASIC), an electronic circuit, a processor (shared, dedicated, or group) and memory that execute one or more software or firmware programs, a combinational logic circuit, and/or other suitable components that provide the described functionality.

In some embodiments, the modules 205 may include, for example, a receiving module 221, a detecting module 223, a matrix generating module 225, a gesture determining module 227, a navigation information determining module 229 and other modules 231. The other modules 231 may be used to perform various miscellaneous functionalities of the intersection management system 105. It will be appreciated that such aforementioned modules 205 may be represented as a single module or a combination of different modules.

In some embodiments, the receiving module 221 may receive sensor data 207 from one or more sensors 103 configured in the autonomous vehicle 101. As an example, the sensor data may include, but not limited to, depth of an object with respect to the autonomous vehicle 101, and one or more images and a video of environment surrounding the autonomous vehicle 101. As an example, the autonomous vehicle 101 may be a bike, a car, a truck, a bus and the like. In an embodiment, the autonomous vehicle 101 may be configured with the one or more sensors 103. As an example, the one or more sensors 103 may include, but not limited to, Light Detection and Ranging (LIDAR) system, Radio Detection and Ranging (RADAR), Inertial Measurement Unit (IMU), Ultrasonic Sensors, image capturing devices such as stereoscopic depth cameras, and Global Positioning System (GPS). In some embodiments, the receiving module 221 may receive scene data from an intersection management database 106 associated with the intersection management system 105. In some embodiments, the scene data may be real time traffic-related data pertaining to the intersection. As an example, the scene data may include, but not limited to, region identifier, intersection identifier, indication of presence or absence of traffic light signal at the intersection, indication of working status of the traffic light signal, if present, indication of traffic light signal timer, indication of presence or absence of traffic police at the intersection, indication of number of traffic police deployed at the intersection and traffic density based on real-time traffic data.

Further, in some embodiments, the detecting module 223 may detect one or more traffic police and one or more auxiliary objects associated with each of the one or more traffic police from a plurality of objects of interest in the one or more images. As an example, the plurality of objects of interest may include, but not limited to, traffic light signal, a traffic sign, the one or more traffic police, and the one or more auxiliary objects associated with the one or more traffic police. In some embodiments, each of the plurality of objects of interest may be detected, tracked and marked with a bounding box. As an example, the processor 109 may employ one or more object detection and classification techniques to detect and classify the plurality of objects of interest.

In some embodiments, the processor 109 may detect the one or more traffic police and the one or more auxiliary objects associated with each of the one or more traffic police when the autonomous vehicle 101 is within a predefined distance from an intersection of roads. As an example, the predefined distance may be 50 meters from the intersection of roads. In some embodiments, the intersection of roads may be determined using one or more predefined intersection determining techniques. The detecting module 223 may detect the one or more traffic police among other objects such as pedestrians in the one or more images based on one or more features that are unique to traffic police. As an example, the one or more features may include, but not limited to, uniform of the traffic police, cap of the traffic police, communication devices such as walky-talky, whistle of the traffic police and a fluorescence jacket of the traffic police. In some embodiments, the one or more auxiliary objects may be objects that are held, worn or used by the traffic police to control the traffic. As an example, the one or more auxiliary objects may include, but not limited to, a signboard, a baton, a whistle, a fine book, a camera and a walky-talky. In some embodiments, the one or more auxiliary objects enable the traffic police to control or manage traffic on road. The data related to one or more traffic police and the one or more auxiliary objects associated with the one or more traffic police may be stored as the detected object data 209.

In some embodiments, the matrix generating module 225 may generate a correlation matrix. In some embodiments, the correlation matrix may include inferred data 211 related to each of the one or more traffic police and the one or more auxiliary objects associated with the corresponding one or more traffic police. As an example, the inferred data 211 may include, but not limited to, an identifier of each of the one or more traffic police, location of each of the one or more traffic police with respect to the autonomous vehicle 101 (also referred as depth of the one or more traffic police), indication of presence or absence of the one or more auxiliary objects, type of each of the one or more auxiliary objects, and values of each of the one or more auxiliary objects associated with each of the one or more traffic police, or position of each of the one or more auxiliary objects with respect to the corresponding one or more traffic police. An exemplary correlation matrix is as shown in the below Table 1.

TABLE 1

| Traffic police ID | Location of traffic police | Presence of auxiliary object | Type of auxiliary object | Value of sign board (if sign board is the auxiliary object) | Position of auxiliary object relative to traffic police |
| --- | --- | --- | --- | --- | --- |
| 1 | 1 | Yes | Sign board | STOP | Right |
| 2 | 2 | Yes | Baton | Not Appliable | Left |

In the above Table 1, the matrix generating module 225 may identify each of the one or more traffic police present at the intersection of roads, uniquely, by indicating a corresponding traffic police ID. Further, the matrix generating module 225 may indicate the location of each traffic police with respect to the position of the autonomous vehicle 101 i.e. depth of the traffic police from the autonomous vehicle 101 by a value as shown in Table 1. In some embodiments, value "1" may indicate that, the traffic police assigned with this value is most proximal to the autonomous vehicle 101 when compared to rest of the one or more traffic police present at the intersection. In some embodiments, value "2" may indicate that, the traffic police assigned with this value is next most proximal to the autonomous vehicle 101 after the traffic police assigned with value "1", when compared to rest of the one or more traffic police at the intersection. Similarly, every value assigned to each of the one or more traffic police may indicate relative proximity level of the traffic police to the autonomous vehicle 101. Further, the matrix generating module 225 may indicate the presence or absence of the one or more auxiliary objects (props) with the traffic police by indicating "Yes" or "No" respectively, in the correlation matrix. Furthermore, the matrix generating module 225 may indicate a type of auxiliary object (prop) and a value of a sign board in the correlation matrix, when the detected auxiliary object is of the type "sign board". In some embodiments, the value of the sign board corresponds to a symbol or text printed on the sign board. In some embodiments, when the detected auxiliary object is not a sign board, the matrix generating module 225 may indicate a value of a sign board as "Not Applicable". Further, the matrix generating module 225 may indicate a current position of the one or more auxiliary objects in the correlation matrix, for example, whether the auxiliary object is present in left hand of the traffic police or right hand of the traffic police.

In some embodiments, the processor 109 may validate correctness of the information related to the detected objects in the one or more images using the scene data received from the intersection management database 106, to ensure accurate determination of gesture of the one or more traffic police.

Further, in some embodiments, the gesture determining module 227 may determine gesture of the one or more traffic police based on the correlation matrix, and at least one of the video and the one or more images of the environment surrounding the autonomous vehicle 101. In some embodiments, the gesture determining module 227 may determine the gesture using an area of the at least one of the video and the one or more images, enclosed within a bounding box.

The gesture determining module 227 may initially determine a state of each the one or more traffic police detected at the intersection of the roads. As an example, the state of the each of the one or more traffic police may be either "Active" or "idle". In some embodiments, the state of each of the one or more traffic police may be determined by analysing the area of the video comprising the one or more traffic police, enclosed within the bounding box.

Based on the analysis, in one embodiment, if the one or more traffic police are seen to be not performing any physical action, the gesture determining module 227 may infer the state of the one or more traffic police as "Idle".

However, in some scenarios, the one or more traffic police may not be seen to be performing any physical action, but the one or more traffic police may be holding an auxiliary object such as a sign board to indicate a gesture such as "STOP", "START" and the like to the traffic at the intersection of the roads. In such scenarios, the gesture determining module 227 may infer the state of the one or more traffic police as "Active", even though the one or more traffic police are not performing any physical action.

Also, when the one or more traffic police are seen to be performing physical actions such as hand movements towards the traffic at the intersection of the roads, the gesture determining module 227 may infer the state of the one or more traffic police as "Active".

Upon determining the state of each of the one or more traffic police detected at the intersection of roads, the gesture determining module 227 may classify the gesture of the one or more traffic police whose state is determined to be "Active" (also referred as active traffic police hereinafter in the present disclosure) among the one or more traffic police.

Upon determining the one or more active traffic police, the gesture determining module 227 may determine presence or absence of the one or more auxiliary objects associated with each of the one or more active traffic police. In some embodiments, the gesture determining module 227 may use the generated correlation matrix to determine the presence or absence of the one or more auxiliary objects with each of the one or more active traffic police.

When the one or more active traffic police are determined to be associated with one or more auxiliary objects, i.e. when the presence of the one or more auxiliary objects is determined, the gesture determining module 227 may select an auxiliary object among the one or more auxiliary objects. In some embodiments, the auxiliary object among the one or more auxiliary objects may be selected based on a position, visibility or a type of each of the one or more auxiliary objects. In some embodiments, the gesture determining module 227 may select the auxiliary object based on the following criteria.

a. When the position of the auxiliary objects is considered as the parameter, the gesture determining module 227 may select the auxiliary object which is positioned in a manner that it is visible to the one or more sensors 103 of the autonomous vehicle 101.

b. When the visibility of the auxiliary objects is considered as the parameter, the gesture determining module 227 may select the auxiliary object which is clearly and completely visible to one or more sensors 103 of the autonomous vehicle 101.

As an example, consider the following examples:

Example 1

TABLE 2

| Parameter | Value |
|---|---|
| Number of auxiliary objects | 2 |
| Type of auxiliary objects | Signboard |
| | walky-talky |
| Position of auxiliary objects | Right hand lifted up showcasing the Signboard to the traffic |
| | Walky-talky in left hand in a lowered hand position |
| Visibility | Signboard and value of Signboard clearly visible |
| | Walky-talky partially visible |

In the above example 1, as per the criteria, the gesture determining module 227 may select the auxiliary object of type "Signboard" since, the position of the auxiliary object is "Right hand lifted up showcasing the Signboard" which is visible to the one or more sensors 103 of the autonomous vehicle 101, and visibility of the auxiliary object is "Clearly visible".

Example 2

TABLE 3

| Parameter | Value |
| --- | --- |
| Number of auxiliary objects | 2 |
| Type of auxiliary objects | Signboard 1 |
| | Signboard 2 |
| Position of auxiliary objects | Left hand lifted up showcasing the Signboard 2 to the traffic |
| | Right hand lowered down holding the Signboard 1 |
| Visibility | Signboard 2 and value of Signboard 2 clearly visible |
| | Signboard 1 partially visible and value of Signboard 1 not visible. |

In the above example 2, though both the auxiliary objects are of the type "Signboard", as per the criteria, the gesture determining module 227 may select the auxiliary object "Signboard 2", since the position of the auxiliary object "Signboard 2" is "left hand lifted up showcasing the value of Signboard 2 to the traffic" which is visible to the one or more sensors 103 of the autonomous vehicle 101, and visibility of the auxiliary object is "Signboard 2" is "Clearly visible". While "Signboard 1" is in a right hand lowered down position and partially visible, which is not directed to the traffic.

Example 3

TABLE 4

| Parameter | Value |
| --- | --- |
| Number of auxiliary objects | 2 |
| Type of auxiliary objects | Signboard 1 |
| | Signboard 2 |
| Position of auxiliary objects | Left hand lifted up showcasing the Signboard 2 to the traffic |
| | Right hand lifted up showcasing the Signboard 1 to the traffic |
| Visibility | Signboard 2 and value of Signboard 2 clearly visible |
| | Signboard 1 and value of Signboard 1 clearly visible. |

In the above example 3, though both the auxiliary objects are of the type "Signboard", the gesture determining module 227 may not select either of the auxiliary objects, since two signboards having two different values cannot be indicated towards the traffic simultaneously. Therefore, the gesture determining module 227 may consider the scenario of Example 3 as an invalid scenario. When such invalid scenarios are encountered, the gesture determining module 227 may wait for a predefined time period and recheck the position, visibility and type of the auxiliary objects, until the gesture determining module 227 encounters a valid scenario (as possibility could be that both the sign boards 1 and 2 are meant for signalling traffic of two different lanes) as seen in Example 1, Example 2 and the like.

In some embodiments, upon selecting the auxiliary object from the one or more auxiliary objects associated with the one or more active traffic police, the gesture determining module 227 may infer a value of the selected auxiliary object as the gesture of the corresponding active traffic police. As an example, if the selected auxiliary object is a signboard which indicates the value "STOP", then the gesture of the corresponding active traffic police is inferred as "STOP". As an example, if the selected auxiliary object is a signboard which indicates the value "RIGHT", then the gesture of the corresponding active traffic police is inferred as "RIGHT". The gesture thus determined by the gesture determining module 227 may be stored as the gesture data 213.

Returning to the aspect of determining the presence or absence of the one or more auxiliary objects using the generated correlation matrix, the gesture determining module 227 may also determine dynamic hand gestures of the one or more active traffic police. In some embodiments, the gesture determining module 227 may determine the dynamic hand gesture of the one or more active traffic police when at least one of two predefined conditions i.e. condition 1 or condition 2 is detected. In some embodiments, condition 1 may be absence of the one or more auxiliary objects with the one or more active traffic police. In some embodiments, condition 2 may be presence of the one or more auxiliary objects, but the value of the one or more auxiliary objects is indeterminable. Therefore, when either condition 1 or condition 2 is detected i.e. when one or more auxiliary objects are absent or when the presence of the one or more auxiliary objects is detected, and value of the detected one or more auxiliary objects is indeterminable, the gesture determining module 227 may determine the dynamic hand gestures of the active traffic police who is detected to fall under one of the above two conditions. As an example, the dynamic hand gestures may include, but not limited to, hand movements which indicate actions such as "STOP", "MOVE", "START", "RIGHT", "LEFT" and the like. In some embodiments, the gesture determining module 227 may use an area, of the at least one of the video and the one or more images of the environment surrounding the autonomous vehicle 101, enclosed within a bounding box, corresponding to the one or more active traffic police, to determine the dynamic hand gesture of the one or more active traffic police. In some embodiments, the gesture determining module 227 may use one or more Convolutional Neural Network (CNN) techniques for determining the dynamic hand gesture. In some embodiments, the one or more CNN techniques may be trained with sample videos comprising different dynamic hand gestures used by a traffic police for controlling traffic at an intersection. For instance, the sample videos may include different dynamic hand gestures captured from multiple angles and dynamic hand gestures with or without an auxiliary object in the hand. As an example, consider the traffic police performs a dynamic hand gesture of "STOP" while he is holding a Walky-talky in his hand. However, the gesture determining module 227 may be trained to consider such run time variations as the dynamic hand gesture "STOP" itself, though there is presence of a walky-talky in his hand. As an example, consider the traffic police performs a dynamic hand gesture of "MOVE RIGHT" while he is holding a signboard indicating "STOP" in his hand. However, the gesture determining module 227 may be trained to consider such run time variations as the dynamic hand gesture as "MOVE RIGHT" itself, though there is presence of a signboard in his hand, since the signboard is not showcased towards the traffic but it is just held by the traffic police while performing a dynamic hand gesture. Further, the gesture determining module 227 may learn spatiotemporal features from consecutive frames of at least one of the video and the one or more images, to determine the dynamic hand gesture accurately. The dynamic hand gesture thus determined by the gesture determining module 227 may be stored as the gesture data 213.

Further, in some embodiments, the navigation information determining module 229 may determine navigation information 215 for the autonomous vehicle 101 based on the correlation matrix, the detected object data and the determined gesture, for navigating the autonomous vehicle 101. In some embodiments, the navigation information 215 may include, but not limited to, a plurality of directing commands. As an example, the plurality of directing commands may include, but not limited to, "START", "STOP", "TURN LEFT", "TURN RIGHT", "CHANGE LANE", "SLOW DOWN", "STAY IDLE", or "KEEP STRAIGHT".

In some embodiments, to determine the navigation information, the navigation information determining module 229 may initially determine a candidate traffic police, proximal to the autonomous vehicle, from the one or more active traffic police, based on the location of each of the one or more active traffic police with respect to the autonomous vehicle 101. In some embodiments, candidate traffic police proximal to the autonomous vehicle 101 may be the nearest active traffic police to the autonomous vehicle 101 when compared to the other active traffic police present at the intersection of roads. In some embodiments, the candidate traffic police may be the traffic police, whose gesture, the autonomous vehicle 101 has to follow. In some embodiments, the navigation information determining module 229 may determine proximity of the candidate traffic police based on the corresponding depth information received as part of the sensor data 207. In some other embodiments, the navigation information determining module 229 may determine the traffic police whose location with respect to the autonomous vehicle 101 is indicated by the value "1" in the correlation matrix as the traffic police who is most proximal to the autonomous vehicle 101.

Thereafter, the navigation information determining module 229 may determine the navigation information for the autonomous vehicle 101 based on the determined gesture of the candidate traffic police.

As an example, when the value of the determined gesture is determined as "STOP", the navigation information 215 is determined to be "STOP" i.e. the autonomous vehicle 101 is provided with a directing command "STOP". As an example, when the value of the determined gesture is determined as "LEFT", the navigation information 215 is determined to be "TURN LEFT" i.e. the autonomous vehicle 101 is provided with a directing command "TURN LEFT".

Further, in some embodiments, the navigation information determining module 229 may provide the determined navigation information 215 to a navigation module 107 associated with the intersection management system 105. The navigation module 107 may navigate the autonomous vehicle 101 in accordance with the navigation information 215.

In some embodiments, the present disclosure may be activated when the traffic light signal present at the intersection of roads is not functional. Generally, the autonomous vehicle 101 follows indication of the traffic light signal when the traffic light signal is functional. However, when the traffic light signal is not functional, the intersection management system 105 may be activated to determine gesture of the one or more active traffic police present at the intersection of roads.

In some embodiments, consider a condition, when the traffic light signal is not functional, but one traffic police is present at the intersection of roads. Then the intersection management system 105 may consider the traffic police as the candidate traffic police. Thereafter, the intersection management system 105 may determine gesture of the candidate traffic police to determine navigation information for the autonomous vehicle 101. However, if the only traffic police present at the intersection of the roads is in an idle state, the intersection management system 105 may wait for a predefined time period at its current position. Upon completion of the predefined time period, the intersection management system 105 may recheck the state of the traffic police. If the state of the traffic police is determined to be "active", then the intersection management system 105 may proceed to determine the gesture of the traffic police.

In some embodiments, consider a condition, when the traffic light signal is not functional, but more than one traffic police is present at the intersection of roads. If all the traffic police present at the intersection of the roads are in an idle state, the intersection management system 105 may wait for the predefined time period at its current position. Upon completion of the predefined time period, the intersection management system 105 may recheck the state of the traffic police. If the state of at least one or more of the traffic police is determined to be "active", then the intersection management system 105 may proceed with determining the gesture of each traffic police whose state is determined to be "active". If the state of more than one traffic police is determined to be "active", then the intersection management system 105 may proceed to determine the nearest and "active" traffic police and manoeuvre the autonomous vehicle 101 according to the gesture of the corresponding traffic police.

In some embodiments, consider a condition, when the traffic light signal is not functional, and no traffic police are present at the intersection of roads. In such scenarios, the navigation module 107 may decrease speed of the autonomous vehicle 101 and navigate based on speed, direction and movement of another vehicle moving ahead of the autonomous vehicle 101. Alternatively, the navigation module 107 may navigate the autonomous vehicle 101 based on real-time obstacle detection using the one or more sensors 103 configured in the autonomous vehicle 101.

Henceforth, the process of navigating an autonomous vehicle at an intersection of roads is explained with the help of one or more examples for better understanding of the present disclosure. However, the one or more examples should not be considered as limitation of the present disclosure.

Figure 2B:
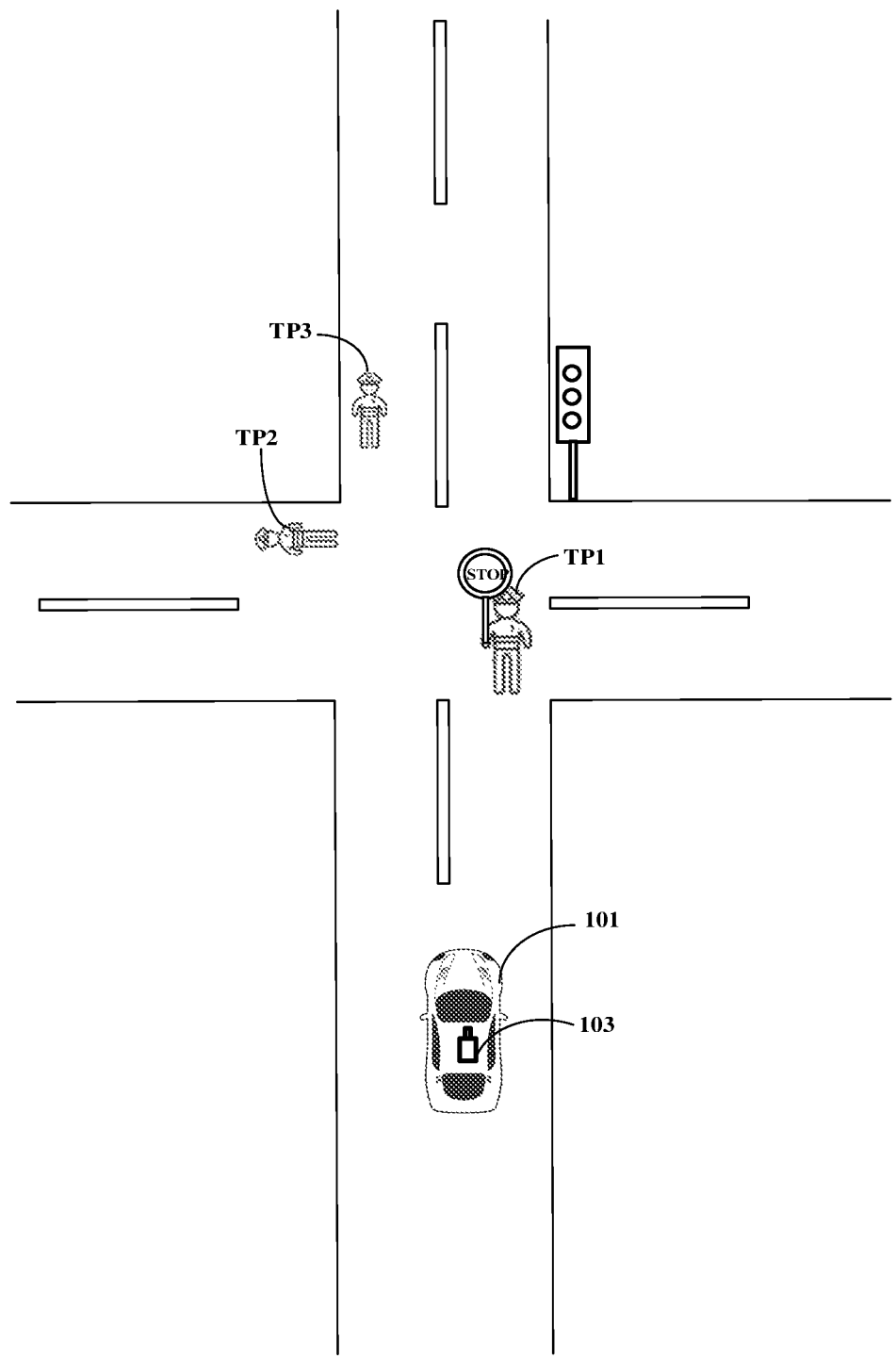
FIG. 2B and FIG. 2C show exemplary illustrations of navigating an autonomous vehicle at an intersection of roads in accordance with some embodiments of the present disclosure.

Consider an exemplary illustration as shown in the FIG. 2B. In this scenario, consider that the traffic light signal is not functional and there are 3 traffic police, TP1, TP2 and TP3 at an intersection of roads (INT 1). Consider the autonomous vehicle 101 is at a distance of 30 meters from the intersection of roads. The processor 109 may detect the traffic light signal is not functional at the intersection of roads based on object detection and classification. Therefore, the intersection management system 105 may be activated to detect the one or more traffic police (TP1, TP2 and TP3) and the one or more auxiliary objects associated with each of the one or more traffic police (TP1, TP2 and TP3). Upon detecting the one or more traffic police (TP1, TP2 and TP3) and the one or more auxiliary objects associated with each of the one or more traffic police (TP1, TP2 and TP3), the intersection management system 105 may generate a correlation matrix as shown in the below Table 5.

TABLE 5

| Traffic police ID | Location of traffic police | Presence of auxiliary object | Type of auxiliary object | Value of sign board (if sign board is the auxiliary object) | Position of auxiliary object relative to traffic police |
|---|---|---|---|---|---|
| TP1 | 1 | Yes | Sign board | STOP | Right |
| TP2 | 2 | Yes | Baton | Not Appliable | Left |
| TP3 | 3 | No | Not Applicable | Not Applicable | Not Applicable |

As per the above Table 5,
- traffic police TP1 is standing closest to the autonomous vehicle 101. Further, traffic police TP1 is holding a Signboard indicating "STOP" in his right hand.
- traffic police TP2 is the second closest traffic police to the autonomous vehicle 101, and is holding a Baton in his left hand.
- traffic police TP3 is the least closest traffic police to the autonomous vehicle 101, and is not associated with any auxiliary objects.

Further, consider that, the signboard and value of signboard held by traffic police TP1 is clearly visible. Furthermore, consider that, the baton held by the traffic police TP2 is partially visible.

Therefore, as per the criteria explained in various embodiments of the present disclosure, the intersection management system 105 selects the traffic police TP1 as the candidate traffic police, since the auxiliary object is "Signboard", position is "right hand and facing towards the autonomous vehicle 101" and visibility is "Clearly visible".

Therefore, the intersection management system 105 infers the value of the signboard i.e. "STOP" as the gesture of the traffic police TP1. Based on the determined gesture, the intersection management system 105 determines the navigation information i.e. the directing command as "STOP" for the autonomous vehicle 101. Therefore, the navigation module 107 follows the navigation information and stops the autonomous vehicle 101.

Figure 2C:
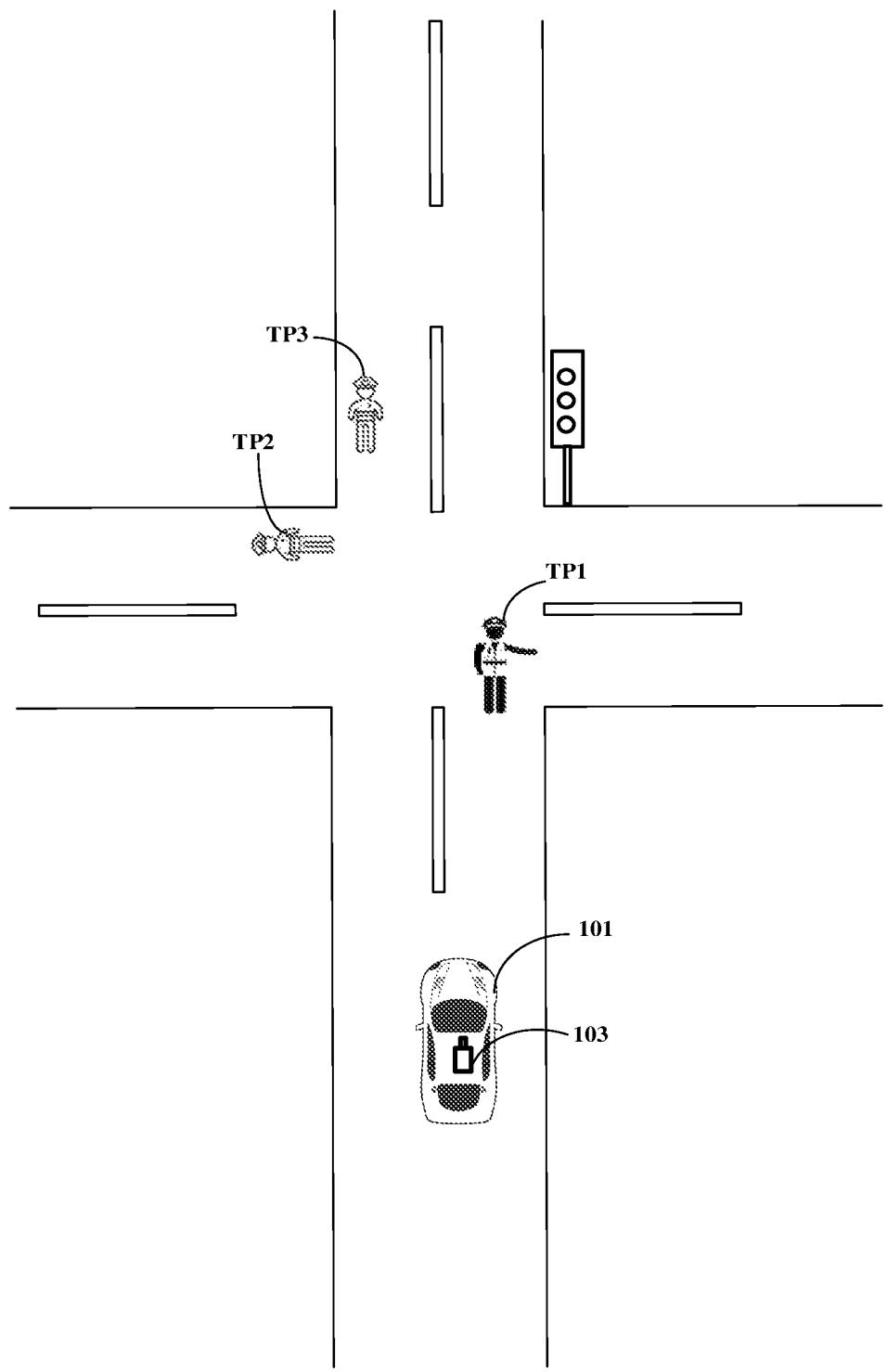

Consider another scenario as shown in the FIG. 2C, where the correlation matrix generated is as shown in the below Table 6.

TABLE 6

| Traffic police ID | Location of traffic police | Presence of auxiliary object | Type of auxiliary object | Value of sign board (if sign board is the auxiliary object) | Position of auxiliary object relative to traffic police |
|---|---|---|---|---|---|
| TP1 | 1 | Yes | Walky-talky | Not Appliable | Right |
| TP2 | 2 | Yes | Baton | Not Appliable | Left |
| TP3 | 3 | No | Not Applicable | Not Applicable | Not Applicable |

As per the above Table 6,
- traffic police TP1 is standing closest to the autonomous vehicle 101. Further, traffic police TP1 is holding a walky-talky in his right hand.
- traffic police TP2 is the second closest traffic police to the autonomous vehicle 101, and is holding a Baton in his left hand.
- traffic police TP3 is the least closest traffic police to the autonomous vehicle 101, and is not associated with any auxiliary objects.

Though there are 3 traffic police, none of the traffic police are associated with a signboard to provide a gesture to the traffic. Therefore, the intersection management system 105 may now determine dynamic hand gestures of each of the traffic police TP1, TP2 and TP3 using the one or more CNN techniques. Suppose the dynamic hand gesture of the traffic police TP1 is determined to be "LEFT", TP2 as "STOP" and TP3 as "invalid" (as TP2 is facing towards other lane and not ego lane where the autonomous vehicle 101 is present). Based on the determined gesture, the intersection management system 105 may consider the gesture of the "nearest" and "active" Traffic police (TP1) for determining the navigation information. Based on the gesture, the intersection management system 105 determines the navigation information i.e. the directing command as "MOVE LEFT" for the autonomous vehicle 101. Therefore, the navigation module 107 follows the navigation information and navigates the autonomous vehicle 101 to the left direction.

Figure 3:
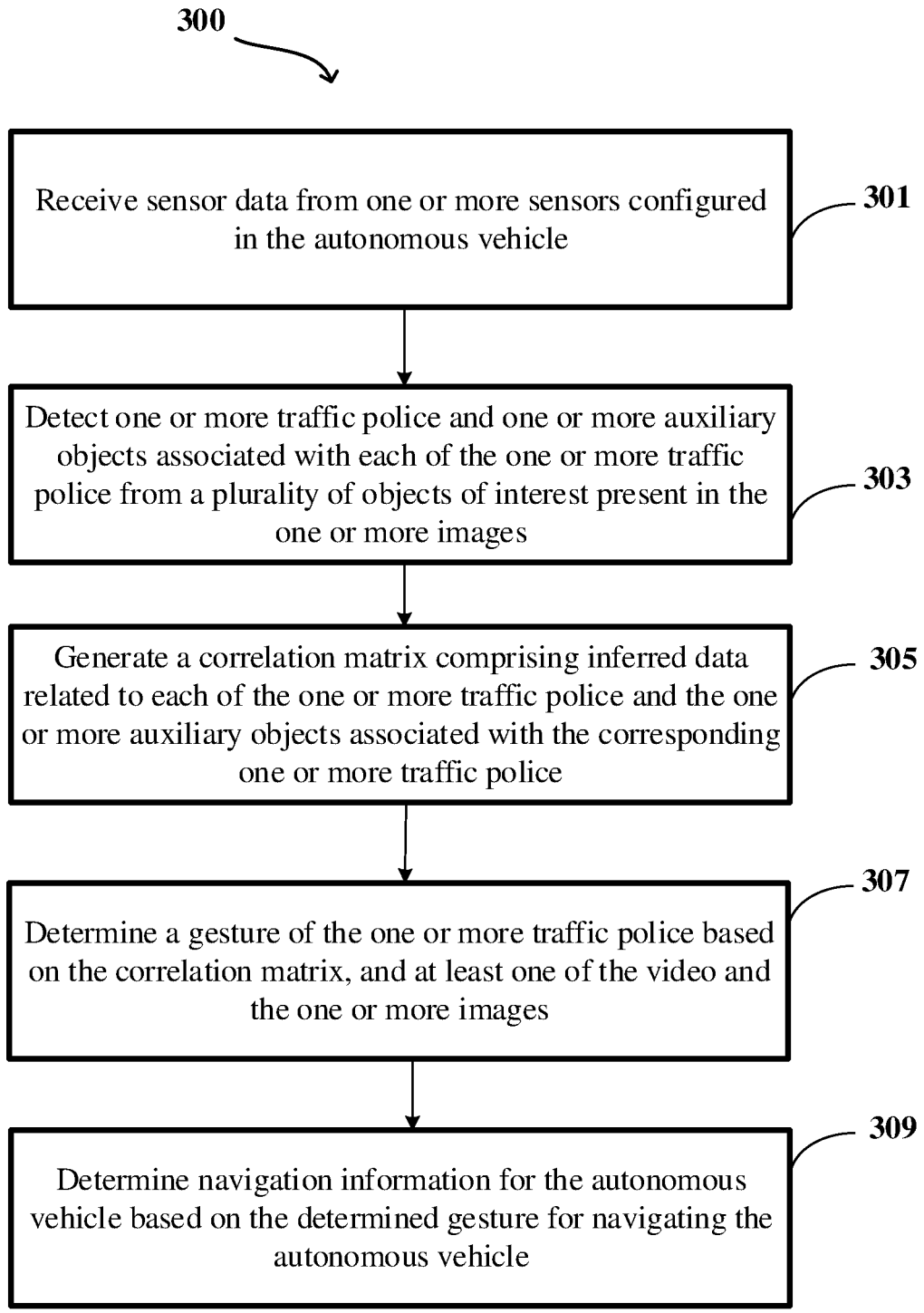
FIG. 3 shows a flowchart illustrating a method of navigating an autonomous vehicle at an intersection of roads in accordance with some embodiments of the present disclosure.

FIG. 3 shows a flowchart illustrating a method of navigating an autonomous vehicle at an intersection of roads in accordance with some embodiments of the present disclosure.

As illustrated in FIG. 3, the method 300 includes one or more blocks illustrating a method of navigating an autonomous vehicle 101 at an intersection of roads. The method 300 may be described in the general context of computer executable instructions. Generally, computer executable instructions can include routines, programs, objects, components, data structures, procedures, modules, and functions, which perform functions or implement abstract data types.

The order in which the method 300 is described is not intended to be construed as a limitation, and any number of the described method blocks can be combined in any order to implement the method 300. Additionally, individual blocks may be deleted from the methods without departing from the spirit and scope of the subject matter described herein. Furthermore, the method 300 can be implemented in any suitable hardware, software, firmware, or combination thereof.

At block 301, the method 300 may include receiving, by a processor 109 of the intersection management system 105 configured in an autonomous vehicle 101, sensor data 207 from one or more sensors 103 configured in the autonomous vehicle 101. In some embodiments, the sensor data 207 may include, but not limited to, at least one of depth of an object with respect to the autonomous vehicle 101, and one or more images and a video of environment surrounding the autonomous vehicle 101.

At block 303, the method 300 may include detecting, by the processor 109, one or more traffic police and one or more auxiliary objects associated with each of the one or more traffic police from a plurality of objects of interest present in the one or more images. In some embodiments, the one or more traffic police and one or more auxiliary objects associated with each of the one or more traffic police are detected, when the autonomous vehicle 101 is within a predefined distance from an intersection of roads.

At block 305, the method 300 may include, generating, by the processor 109, a correlation matrix comprising inferred data 211 related to each of the one or more traffic police and the one or more auxiliary objects associated with the corresponding one or more traffic police.

At block 307, the method 300 may include, determining, by the processor 109, a gesture of the one or more traffic police based on the correlation matrix, and at least one of the video and the one or more images.

At block 309, the method includes, determining, by the processor 109, navigation information for the autonomous vehicle 101 based on the determined gesture, for navigating the autonomous vehicle 101. In some embodiments, the navigation information may include a plurality of directing commands. As an example, the plurality of directing commands may include, but not limited to, "START", "STOP", "TURN LEFT", "TURN RIGHT", "CHANGE LANE", "SLOW DOWN", "STAY IDLE", or "KEEP STRAIGHT".

Figure 4:
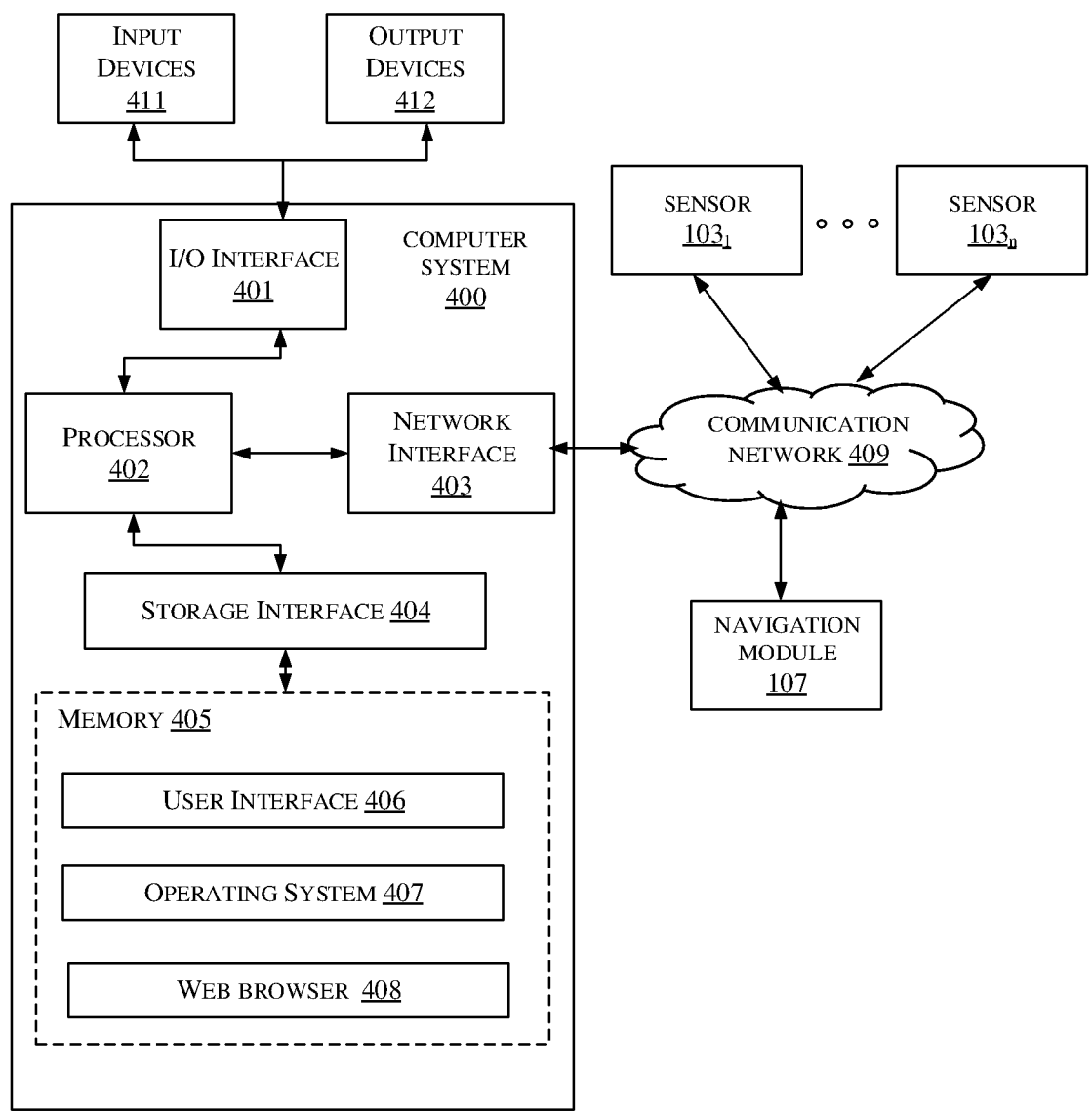
FIG. 4 is a block diagram of an exemplary computer system for implementing embodiments consistent with the present disclosure.

FIG. 4 is a block diagram of an exemplary computer system for implementing embodiments consistent with the present disclosure.

In some embodiments, FIG. 4 illustrates a block diagram of an exemplary computer system 400 for implementing embodiments consistent with the present invention. In some embodiments, the computer system 400 can be intersection management system 105 that is used for navigating an autonomous vehicle 101 at an intersection of roads. The computer system 400 may include a central processing unit ("CPU" or "processor") 402. The processor 402 may include at least one data processor for executing program components for executing user or system-generated business processes. A user may include a person, a person using a device such as those included in this invention, or such a device itself. The processor 402 may include specialized processing units such as integrated system (bus) controllers, memory management control units, floating point units, graphics processing units, digital signal processing units, etc.

The processor 402 may be disposed in communication with input devices 411 and output devices 412 via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 401, computer system 400 may communicate with input devices 411 and output devices 412.

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with one or more sensors 103 ($103_1$ up to $103_n$), and a navigation module 107. In some embodiments, the computer system 400 may communicate with one or more sensors 103 ($103_1$ up to $103_n$), and a navigation module 107 via non-internet or non-IP based communication such as Universal Serial Bus (USB), Bluetooth and the like. The communication network 409 can be implemented as one of the different types of networks, such as intranet or Local Area Network (LAN), Closed Area Network (CAN) and such within the autonomous vehicle. The communication network 409 may either be a dedicated network or a shared network, which represents an association of the different types of networks that use a variety of protocols, for example, Hypertext Transfer Protocol (HTTP), CAN Protocol, Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. The one or more sensors 103 may include, but not limited to, Light Detection and Ranging (LIDAR) system, image capturing devices and Global Positioning System (GPS). In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, a user interface 406, an operating system 407, a web browser 408 etc. In some embodiments, the computer system 400 may store user/application data, such as the data, variables, records, etc. as described in this invention. Such databases may be implemented as fault-tolerant, relational, scalable, secure databases such as Oracle or Sybase.

The operating system 407 may facilitate resource management and operation of the computer system 400. Examples of operating systems 407 include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM®OS/2®, MICROSOFT® WINDOWS® (XP®, VISTA®/7/8, 10 etc.), APPLE® IOS®, GOOGLE™ ANDROID™, BLACKBERRY® OS, or the like. The User interface 406 may facilitate display, execution, interaction, manipulation, or operation of program components through textual or graphical facilities. For example, user interfaces 406 may provide computer interaction interface elements on a display system operatively connected to the computer system 400, such as cursors, icons, checkboxes, menus, scrollers, windows, widgets, etc. Graphical User Interfaces (GUIs) may be employed, including, without limitation, Apple® Macintosh® operating systems' Aqua®, IBM® OS/2®, Microsoft® Windows® (e.g., Aero, Metro, etc.), web interface libraries (e.g., ActiveX®, Java®, Javascript®, AJAX, HTML, Adobe® Flash®, etc.), or the like.

In some embodiments, the computer system 400 may implement the web browser 408 stored program components. The web browser 408 may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers 408 may utilize facilities such as AJAX, DHTML, ADOBE® FLASH®, JAVASCRIPT®, JAVA®, Application Programming Interfaces (APIs), etc. In some embodiments, the computer system 400 may implement a mail server stored program component. The mail server may be an Internet mail server such as Microsoft Exchange, or the like. The mail server may utilize facilities such as Active Server Pages (ASP), ACTIVEX®, ANSI® C++/C #, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 400 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for navigating an autonomous vehicle at an intersection of roads. The illustrated steps are set out to explain the exemplary embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claim.

What is claimed is:

1. A method of navigating an autonomous vehicle at an intersection of roads, the method comprising:
   receiving, by a intersection management system configured in an autonomous vehicle, sensor data from one or more sensors configured in the autonomous vehicle, wherein the sensor data comprises at least one of depth of an object with respect to the autonomous vehicle, and one or more images and a video of environment surrounding the autonomous vehicle;
   detecting, by the intersection management system, one or more traffic police and one or more auxiliary objects associated with each of the one or more traffic police from a plurality of objects of interest present in the one or more images, when the autonomous vehicle is within a predefined distance from an intersection of roads;
   generating, by the intersection management system, a correlation matrix comprising inferred data related to each of the one or more traffic police and the one or more auxiliary objects associated with the corresponding one or more traffic police;
   determining, by the intersection management system, a gesture of the one or more traffic police based on the correlation matrix, and at least one of the video and the one or more images; and
   determining, by the intersection management system, navigation information for the autonomous vehicle based on the correlation matrix and the determined gesture, for navigating the autonomous vehicle.

2. The method as claimed in claim 1, wherein the inferred data comprises at least one of an identifier of each of the one or more traffic police, location of each of the one or more traffic police with respect to the autonomous vehicle, indication of presence or absence of the one or more auxiliary objects, type of each of the one or more auxiliary objects, and values of each of the one or more auxiliary objects associated with each of the one or more traffic police, or position of each of the one or more auxiliary objects with respect to the corresponding one or more traffic police.

3. The method as claimed in claim 1, wherein determining the gesture comprises:
determining a state of each of the one or more traffic police, wherein the state of each of the one or more traffic police is one of "idle" or "active";
detecting presence of the one or more auxiliary objects associated with each of the one or more traffic police whose state is determined to be "active", based on the correlation matrix;
selecting an auxiliary object among the one or more auxiliary objects associated with each of the active traffic police, based on at least one of a position, visibility or a type of each of the one or more auxiliary objects; and
inferring a value of the selected auxiliary object as the gesture of the corresponding active traffic police.

4. The method as claimed in claim 3, wherein, when, at least one of,
the one or more auxiliary objects are absent, or
the presence of one or more auxiliary objects is detected, and value of the detected one or more auxiliary objects is indeterminable,
the method comprises determining, by the intersection management system,
a dynamic hand gesture of the active traffic police based on at least one of a video and one or more images of environment surrounding an autonomous vehicle, using one or more Convolutional Neural Network (CNN) techniques.

5. The method as claimed in claim 1, wherein determining the navigation information comprises:
determining a candidate traffic police, proximal to the autonomous vehicle, from the one or more traffic police whose state is determined to be "active", based on a location of each of the one or more traffic police with respect to the autonomous vehicle; and
determining the navigation information for the autonomous vehicle based on the gesture of the candidate traffic police.

6. An intersection management system for navigating an autonomous vehicle at an intersection of roads, the intersection management system comprises:
a processor; and
a memory communicatively coupled to the processor, wherein the memory stores the processor-executable instructions, which, on execution, causes the processor to:
receive sensor data from one or more sensors configured in the autonomous vehicle, wherein the sensor data comprises at least one of depth of an object with respect to the autonomous vehicle, and one or more images and a video of environment surrounding the autonomous vehicle;
detect one or more traffic police and one or more auxiliary objects associated with each of the one or more traffic police from a plurality of objects of interest present in the one or more images, when the autonomous vehicle is within a predefined distance from an intersection of roads;
generate a correlation matrix comprising inferred data related to each of the one or more traffic police and the one or more auxiliary objects associated with the corresponding one or more traffic police;
determine a gesture of the one or more traffic police based on the correlation matrix, and at least one of the video and the one or more images; and
determine navigation information for the autonomous vehicle based on the correlation matrix and the determined gesture, for navigating the autonomous vehicle.

7. The intersection management system as claimed in claim 6, wherein the inferred data comprises at least one of an identifier of each of the one or more traffic police, location of each of the one or more traffic police with respect to the autonomous vehicle, indication of presence or absence of the one or more auxiliary objects, type of each of the one or more auxiliary objects, and values of each of the one or more auxiliary objects associated with each of the one or more traffic police, or position of each of the one or more auxiliary objects with respect to the corresponding one or more traffic police.

8. The intersection management system as claimed in claim 6, wherein to determine the gesture, the processor is configured to:
determine a state of each of the one or more traffic police, wherein the state of each of the one or more traffic police is one of "idle" or "active";
detect presence of the one or more auxiliary objects associated with each of the one or more traffic police whose state is determined to be "active", based on the correlation matrix;
select an auxiliary object among the one or more auxiliary objects associated with each of the active traffic police, based on at least one of a position, visibility or a type of each of the one or more auxiliary objects; and
infer a value of the selected auxiliary object as the gesture of the corresponding active traffic police.

9. The intersection management system as claimed in claim 8, wherein, when, at least one of,
the one or more auxiliary objects are absent, or
the presence of one or more auxiliary objects is detected, and value of the detected one or more auxiliary objects is indeterminable,
the processor is configured to determine a dynamic hand gesture of the active traffic police based on at least one of a video and one or more images of environment surrounding an autonomous vehicle, using one or more Convolutional Neural Network (CNN) techniques.

10. The intersection management system as claimed in claim 6, wherein to determine the navigation information, the processor is configured to:
determine a candidate traffic police, proximal to the autonomous vehicle, from the one or more traffic police whose state is determined to be "active", based on a location of each of the one or more traffic police with respect to the autonomous vehicle; and
determine the navigation information for the autonomous vehicle based on the gesture of the candidate traffic police.

11. A non-transitory computer readable medium including instructions stored thereon that when processed by at least one processor causes an intersection management system to perform operations comprising:

receiving sensor data from one or more sensors configured in the autonomous vehicle, wherein the sensor data comprises at least one of depth of an object with respect to the autonomous vehicle, and one or more images and a video of environment surrounding the autonomous vehicle;

detecting one or more traffic police and one or more auxiliary objects associated with each of the one or more traffic police from a plurality of objects of interest present in the one or more images, when the autonomous vehicle is within a predefined distance from an intersection of roads;

generating a correlation matrix comprising inferred data related to each of the one or more traffic police and the one or more auxiliary objects associated with the corresponding one or more traffic police;

determining a gesture of the one or more traffic police based on the correlation matrix, and at least one of the video and the one or more images; and determining navigation information for the autonomous vehicle based on the correlation matrix and the determined gesture, for navigating the autonomous vehicle.

* * * * *